Patented Feb. 5, 1929.

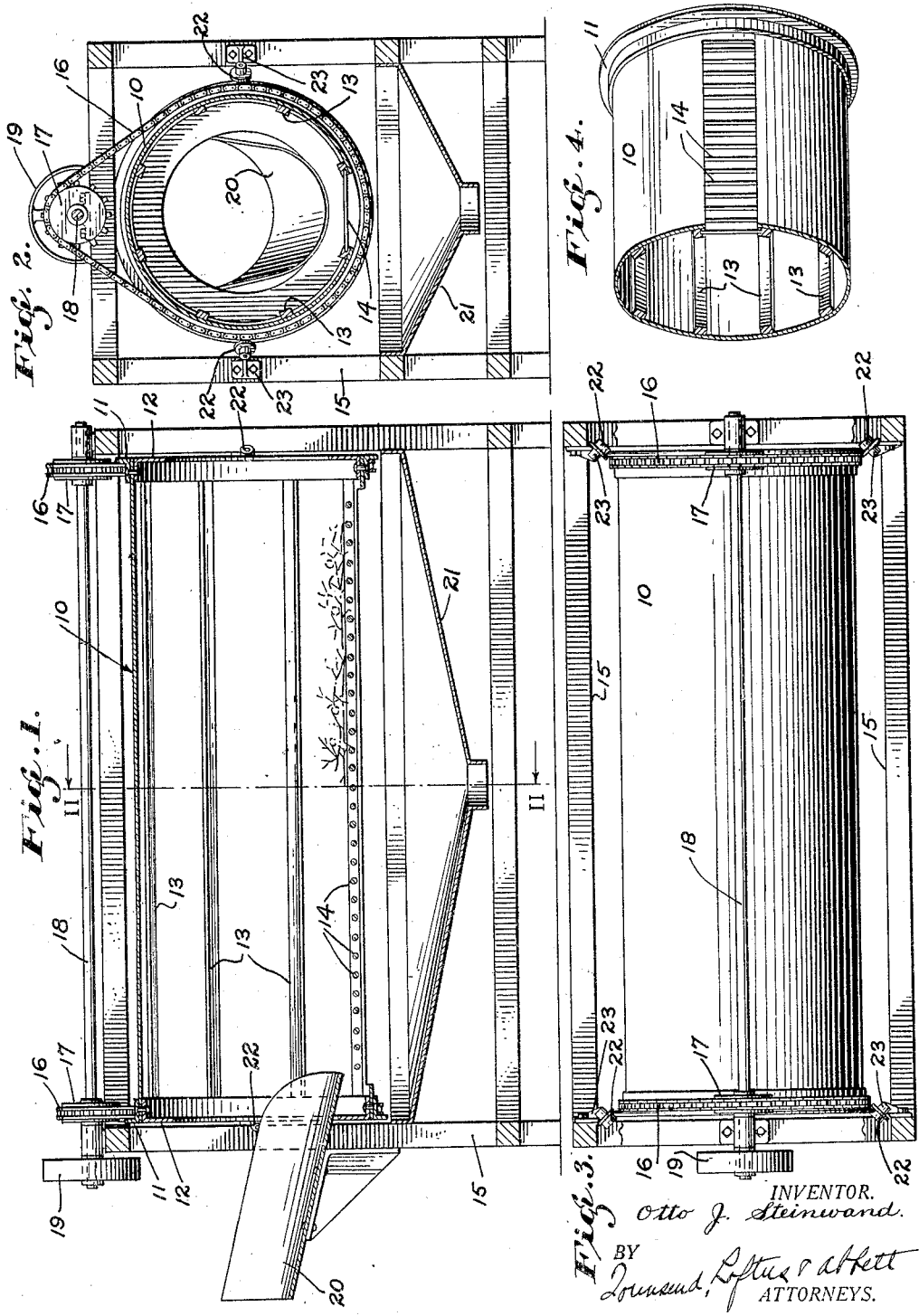

1,700,861

UNITED STATES PATENT OFFICE.

OTTO J. STEINWAND, OF SAN FRANCISCO, CALIFORNIA, ASSIGNOR TO SUSSMAN, WORMSER & COMPANY, OF SAN FRANCISCO, CALIFORNIA, A CORPORATION OF CALIFORNIA.

FRUIT-STEMMING APPARATUS.

Application filed January 31, 1928. Serial No. 250,746.

My present invention relates to an improved apparatus for stemming grapes and the like and more particularly to an improvement in grape stemmers of the rotating drum type.

An object of my invention is to provide a grape stemming device of the rotating drum type wherein the discharge of grapes and the like therefrom will be retarded so as to insure that the grapes will be completely stemmed and not discharged therefrom with the "cap stems" attached.

In stemming grapes it is a simple matter to tumble the bunches of grapes and thus shake them so as to free the grapes from the bunch and various apparatus have been proposed in the prior art for accomplishing this purpose. Many of these prior art devices comprise cylinders or drums formed of screen material completely therearound through the openings of which the freed grapes are discharged as the drum is rotated. When the grapes are freed from the bunch or stalk in a drum of this type, they will be immediately discharged therefrom and it very often happens that a short portion of the stem which commonly is referred to as the "cap stem" will adhere to the grape and be discharged therewith so as to necessitate a further operation of removing these cap stems after the grapes have passed through the tumbling drum. The expression "cap stems" appearing above refers to that short portion of the stem which extends from the grape to the main stem or stalk of the bunch of grapes.

In accordance with my invention, I propose to separate the grapes from the main stem or stalk and at the same time reduce the possibility of these cap stems adhering to the grapes by reducing the size and changing the nature of the discharge outlet of the drum so that the grapes will be tumbled in such a manner that the possibilities of these cap stems adhering thereto will be greatly reduced and therefore a greater proportion of the grapes discharged therefrom will not only be freed of the main stem, but will also be free of attached cap stems.

For a better understanding of my invention, reference should be had to the accompanying drawing, in which I have shown by way of illustration one embodiment of my invention.

In the drawing—

Fig. 1 is a side elevation in section of apparatus embodying my invention,

Fig. 2 is an end elevation in section along line II—II of Fig. 1,

Fig. 3 is a plan view of the apparatus shown in Fig. 1 with the corners broken away to show the manner of supporting the drum, and Fig. 4 is a fragmentary view in perspective of the drum shown in Fig. 1.

In Fig. 1, 10 designates a cylinder having external flanges 11 and internal flanges 12 which form a unitary drum structure. Arranged within the cylinder 10 and extending axially thereof, I have provided a plurality of cleats 13. An opening is provided along a portion of the cylinder 10 to form a discharge outlet therefrom. Arranged across this opening and extending circumferentially of the cylinder 10, I provide a plurality of rods 14 so spaced as to form a grating or grille-work through which the loosened grapes can pass as the drum is rotated. The drum formed by the cylinder 10 is suspended within a frame 15 by means of suitable chains 16 which pass under the ends thereof and over suitable sprockets 17 carried upon a shaft 18. The shaft 18 is journaled upon the frame 15 and carries a pulley 19 which is adapted to be driven from any suitable source of power to thereby cause the drum to rotate. At one end of the drum I provide a suitable hopper 20 by means of which the bunches of grapes can be fed to the interior of the drum and arranged beneath the rotating drum I also provide a hopper 21 which is adapted to catch the loosened grapes and convey them to any suitable receptacle.

In order to prevent longitudinal and sidewise movement of the drum within the frame 15, I provide rollers 22 which are supported upon brackets 23 and engage the flanges 11, as shown in Figs. 2 and 3 of the drawing.

By referring to Fig. 4, it will be seen that the cleats 13 extend at right angles to the rods 14 and that by reason of this arrangement of these elements the bunches of grapes will become arranged with their main stems or stalks extending lengthwise the cylinder and, as a result, at right angles to the rods 14. This will prevent the ends of the stalks being projected through the grille-work and thus becoming caught or discharged therethrough so as to interfere with the successful operation of my device. It will also be seen that the discharge opening as here shown constitutes a small proportion of the total cylinder surface and, as a result, the loosened grapes will be tumbled to some extent before they will be discharged from the drum, and, as a result, should a cap stem adhere thereto, the possibilities of the grape being freed from it will be increased by this additional tumbling of the grape.

In the drawing I have shown the rods 14 as being straight and extending between only two of the cleats 13, but it should be understood that these rods 14 can be curved so as to conform with the surface of the cylinder and that several such openings may be employed, if found to be necessary; and while I have shown the preferred form of my invention as now known to me, it is to be understood that various changes may be made in its construction without departing from the spirit of the invention as defined in the appended claims.

Having thus described my invention, what I claim and desire to secure by Letters Patent is—

1. A grape stemming apparatus comprising, a cylinder adapted to be rotated about its axis, said cylinder having an opening at one end through which bunches of grapes are introduced and spaced openings extending parallel to each other over a portion of its circumference and forming a grating, and cleats extending axially of said cylinder adapted to arrange the stems of the grapes at right angles to said openings, whereby the freed grapes will be discharged through said openings and the stems held within the cylinder until discharged from the end thereof.

2. A grape stemming apparatus comprising, a cylinder adapted to be rotated about its axis, said cylinder having an opening at one end through which bunches of grapes are introduced and other openings arranged parallel in spaced relation to each other and extending circumferentially around a portion of said cylinder forming a grating through which the grapes are discharged, and cleats extending axially of said cylinder adapted to arrange the stems of the grapes at right angles to said openings to thereby prevent them being discharged through said grating.

3. A grape stemming apparatus comprising, a cylinder adapted to be rotated about its axis, said cylinder having an opening at one end through which bunches of grapes are fed, cleats arranged longitudinally within said cylinder, whereby the bunches of grapes will be tumbled to thereby loosen the grapes from their stems, and a grating in the side of said cylinder having its openings extending circumferentially about the cylinder through which the loosened grapes are discharged.

4. A grape stemming apparatus comprising, a cylinder adapted to be rotated about its axis, said cylinder having an opening at one end through which bunches of grapes are fed and an opening extending axially along one side thereof, a plurality of parallel rods extending across said second opening at right angles to the axis of the cylinder and forming a grating through which the freed grapes are discharged, and a plurality of cleats arranged in spaced relation and extending longitudinally of said cylinder, whereby the bunches of grapes will be tumbled to thereby loosen the grapes from their stems as the cylinder rotates, said cleats and parallel rods being arranged at right angles to each other so that the bunches of grapes will lie with their main stems at right angles to said rods and thereby prevent the discharge of the main grape stems through said grating.

OTTO J. STEINWAND